UNITED STATES PATENT OFFICE.

CHRISTOPHER G. DODGE, JR., OF PHILADELPHIA, PENNSYLVANIA.

DISTEMPER-PAINT.

SPECIFICATION forming part of Reissued Letters Patent No 9,411, dated October 12, 1880.

Original No. 223,895, dated January 27, 1880. Application for reissue filed September 3, 1880.

*To all whom it may concern:*

Be it known that I, CHRISTOPHER G. DODGE, Jr., formerly of the city, county, and State of New York, but now of the city and county of Philadelphia, and State of Pennsylvania, have invented a new and useful Improvement in Prepared Calcimine or Distemper Paints, of which the following is a specification.

In this class of paints the binding-agent is a size formed by mixing glue or other similar soluble and adhesive material with water.

As heretofore commercially known, the calcimine or distemper has been in the form of a cake or powder, having the glue, &c., necessary for the size thoroughly incorporated with the pigment, and the whole being in a dry condition. In the preparation of these dry cakes and powders the materials are ground together, sometimes in a dry state or sometimes, and more effectually, in a wet or pasty condition.

When the wet process has been used it has heretofore been considered necessary to press and thoroughly dry the mass, on account of the supposed impossibility of preserving the paint in a moist condition. When required for use water is added to convert the dry glue of the mixture into a size, and unless the water be hot much time is required for the softening and solution of the glue. Thus not only is the process of manufacture lengthened, but the product, in its hard and dry condition, cannot be rapidly dissolved under ordinary circumstances.

It is the object of my invention to furnish a calcimine or distemper which may be immediately reduced to the consistency required by the mere addition of cold water.

I have discovered that a calcimine having its binding agent in a pasty or moist state can be maintained in a proper condition for commercial purposes and without deterioration, or, in other words, that the pigments can be preserved in combination with a pasty or thick size in which the softening and solution of the glue has been completed, so that cold water will act upon it at once. I am thus enabled, when the wet process of manufacture is used, to arrest the same before the pressing and drying, and thus expedite the manufacture, and in any case to furnish a ready-sized calcimine of moderate bulk in proper condition to be handled as an article of commerce.

I use paris-white, glue, white soap, chloride of calcium, carbolic acid, and water, in the proportions hereinafter specified.

In preparing the calcimine or distemper paints, I take three hundred and twenty pounds of paris-white, or its equivalent, and add to it a prepared sizing composed of sixteen pounds of glue, sixteen pounds of white soap, eight pounds of chloride of calcium, and one hundred and sixty pounds of water. These ingredients are mixed and ground together until thoroughly intermingled, and to the mixture is then added one-eighth of a pound of pure carbolic acid.

The mixture thus prepared forms a calcimine, wall, or distemper paint of a consistency similar to white lead in oil, and is put up into packages of various sizes for market, and is diluted with water when required for use.

The effect of the soap and calcium salt is to produce a wall paint or calcimine that will work smooth under the brush; that will not peel, crack, or scale from the surface to which it may be applied; that will not decompose, putrefy, or grow offensive in odor by standing, and will act as a disinfectant to the surface to which it may be applied.

Calcimine, wall, or distemper paint compounded in the manner hereinbefore described, with the addition of coloring materials, may be made of various shades and tints, and the addition of the hereinbefore-described sizing to colored pigments or lakes forms what are termed "distemper" or "fresco" colors, or "distemper" paints.

Having thus described my invention, I claim as new and desire to secure by Letters Patent—

1. As a new article of manufacture, a ready-sized calcimine or distemper paint of a permanently pasty consistency, whereby it is ready for use at once upon the addition of cold water.

2. An improved calcimine or distemper paint, consisting of paris-white, glue, white soap, chloride of calcium, carbolic acid, and water, mixed in the proportions substantially as herein described, and for the purpose set forth.

CHRISTOPHER G. DODGE, JR.

Witnesses:

WM. H. MYERS,

J. WALTER DOUGLASS.